US012681904B2

(12) United States Patent
Liao et al.

(10) Patent No.: US 12,681,904 B2
(45) Date of Patent: Jul. 14, 2026

(54) LOCK MANAGEMENT METHOD, APPARATUS, AND SYSTEM

(71) Applicant: Huawei Technologies Co., Ltd., Shenzhen (CN)

(72) Inventors: Zhijian Liao, Chengdu (CN); Bowei Yu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/736,755

(22) Filed: Jun. 7, 2024

(65) Prior Publication Data

US 2024/0320194 A1     Sep. 26, 2024

Related U.S. Application Data

(63) Continuation of application No. PCT/CN2022/111424, filed on Aug. 10, 2022.

(30) Foreign Application Priority Data

Dec. 9, 2021     (CN) .......................... 202111498169.0

(51) Int. Cl.
*G06F 16/176* (2019.01)
*G06F 16/17* (2019.01)
*G06F 16/182* (2019.01)

(52) U.S. Cl.
CPC ...... *G06F 16/1774* (2019.01); *G06F 16/1734* (2019.01); *G06F 16/183* (2019.01)

(58) Field of Classification Search
CPC ............. G06F 16/1774; G06F 16/1734; G06F 16/183; G06F 2209/522; G06F 9/526; G06F 9/5038; G06F 9/544

USPC ......... 707/613, 704, 781, 999.008, 999.102, 707/E17.005, E17.007, 600, 607, 608, 707/687, 705, 999.1, 999.2, 999.001; 709/223, 224, 225, 226, 227, 228, 229; 711/100, 119, 141, 144, 145, 150, 154, 711/156

See application file for complete search history.

(56) References Cited

U.S. PATENT DOCUMENTS

| | | | | |
|---|---|---|---|---|
| 10,911,358 B1* | 2/2021 | Nakibly | .............. | G06F 12/0862 |
| 2005/0203904 A1* | 9/2005 | Mehaffy | ................. | G06F 9/526 |
| | | | | 710/200 |

(Continued)

FOREIGN PATENT DOCUMENTS

| | | |
|---|---|---|
| CN | 109947575 A | 6/2019 |
| CN | 110471779 A | 11/2019 |

*Primary Examiner* — Md I Uddin
(74) *Attorney, Agent, or Firm* — Slater Matsil, LLP

(57) ABSTRACT

Example methods, apparatuses, and distributed systems are provided. An example method includes acquiring, by a network interface card of a serving device, a lock acquisition request of a client. The lock acquisition request requests to acquire access permission for a shared resource. The example method further includes determining, by the network interface card based on recorded lock information, whether the client is enabled to acquire a lock of the shared resource. The example method further includes, in response to determining that the client is enabled to acquire the lock of the shared resource, sending, by the network interface card, a lock acquisition success response to the client. The lock acquisition success response indicates that the client successfully acquires the lock of the shared resource.

19 Claims, 3 Drawing Sheets

(56) References Cited

U.S. PATENT DOCUMENTS

2010/0017409 A1* 1/2010 Rawat .................... H04L 41/00
                                                707/E17.007
2012/0311606 A1* 12/2012 Marathe ................. G06F 9/526
                                                718/107
2013/0290583 A1* 10/2013 Dice ....................... G06F 9/526
                                                710/200
2013/0339560 A1* 12/2013 Aoshima .................. G06F 9/52
                                                710/200
2016/0043965 A1 2/2016 Goldenberg et al.

* cited by examiner

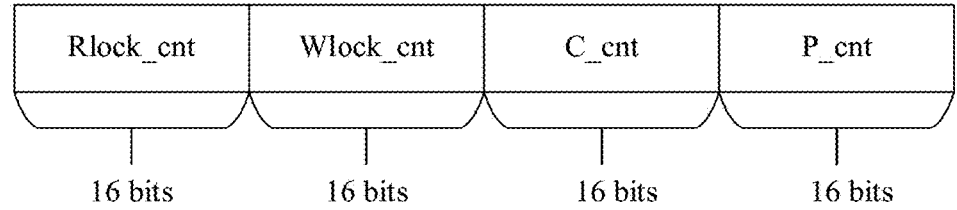

| Rlock_cnt | Wlock_cnt | C_cnt | P_cnt |
|---|---|---|---|
| 16 bits | 16 bits | 16 bits | 16 bits |

FIG. 3

Serving Device 20

| Network interface card 114 | Internal memory 113 |
|---|---|

Client 10-a

Client 10-b

S401: Lock acquisition request

402a

Determine, based on lock management information, whether the client can acquire a lock No → S402b: Add access information of the client 10 to a cache queue of a lock of a shared resource Yes S403: Lock acquisition success response S404: Lock release request S405: Release a lock resource of the client

406

Determine whether a write lock and a read lock of the shared resource are both idle Yes S407: Determine, based on the cache queue of the shared resource, an access node that can acquire the lock For some or all of entries in the cache queue S408: Lock acquisition success response

FIG. 4

LOCK MANAGEMENT METHOD, APPARATUS, AND SYSTEM

CROSS-REFERENCE TO RELATED APPLICATIONS

This application is a continuation of International Application No. PCT/CN2022/111424, filed on Aug. 10, 2022, which claims priority to Chinese Patent Application Chinese Patent Application No. 202111498169.0, filed on Dec. 9, 2021. The disclosures of the aforementioned applications are hereby incorporated by reference in their entireties.

TECHNICAL FIELD

This application relates to the field of computer technologies, and in particular, to a lock management method and apparatus, and a system.

BACKGROUND

A lock is a basic control mechanism for a plurality of objects to orderly access a same shared resource. The plurality of objects may be, for example, a plurality of computing devices in a same distributed system.

Currently, a lock-based data access manner includes: A corresponding lock is set for each shared resource. A visitor needs to first acquire the lock before accessing the shared resource. After completing the access, the visitor releases the lock. Therefore, it is ensured that a plurality of visitors can orderly access the shared resource.

The distributed system is used as an example. It is assumed that the distributed system includes a client and a serving device. Before initiating access to a shared resource, the client may first send, to the serving device, a lock acquisition request used to acquire access permission for the shared resource. The serving device receives the lock acquisition request via a network interface card, and the network interface card sends the lock acquisition request to a processor of the serving device. Then, the processor performs a lock acquisition operation on the lock. A lock release operation is subject to a same procedure, and is not described herein. The foregoing operation occupies a large quantity of computing resources, network resources, and I/O resources of the processor, and a processing speed of the processor further affects a data processing request. As a result, the entire data processing request cannot meet a high-performance service requirement.

SUMMARY

This application provides a lock management method and apparatus, and a system, to reduce a load of processing operation of a CPU and improve system performance.

According to a first aspect, an embodiment of this application provides a lock management method. The method may be applied to a distributed system, and the distributed system includes a client and a serving device. In the method, a network interface card of the serving device acquires a lock acquisition request of the client, where the lock acquisition request is used to request to acquire access permission for a shared resource. The network interface card determines, based on recorded lock information of the shared resource, whether the client can acquire a lock of the shared resource. When determining that the client can acquire the lock of the shared resource, the network interface card sends a lock acquisition success response to the client, where the lock acquisition success response indicates that the client successfully acquires the access permission for the shared resource.

According to the foregoing method, the network interface card acquires the lock acquisition request of the client, and determines, based on the recorded lock information, whether the client can acquire the lock of the shared resource. The network interface card determines whether the client can acquire the lock of the shared resource, without participation of a CPU, so that CPU usage is reduced. This helps improve resource utilization of the CPU. Further, when determining that the client can acquire the lock of the shared resource, the network interface card may directly send the lock acquisition success response to the client, and the CPU does not need to indicate this operation. Therefore, a response speed to the lock acquisition request may be increased, a delay may be reduced, and system performance may be improved.

In a possible implementation, when the network interface card determines the client that requests to acquire the lock of the shared resource, a manner may be that the network interface card receives the lock acquisition request of the client. Another manner may be that the network interface card acquires the lock acquisition request of the client from a cache queue corresponding to the shared resource.

According to the foregoing method, the network interface card may directly respond to the lock acquisition request sent by the client; or may temporarily put the lock acquisition request into the cache queue, and the network interface card may acquire the lock acquisition request from the cache queue. Therefore, flexibility of managing the lock acquisition request is improved.

In a possible implementation, the lock information of the shared resource includes a quantity (denoted as a first quantity) of nodes that request to acquire a write lock of the shared resource and a quantity (denoted as a second quantity) of nodes that request to acquire a read lock of the shared resource.

That the network interface card determines, based on recorded lock information, whether the client can acquire a lock of the shared resource includes: If the lock acquisition request of the client is used to request to acquire read operation permission (that is, the read lock) of the shared resource, when the first quantity indicates that the write lock of the shared resource is in an idle state, for example, the first quantity is 0, to be specific, the quantity of nodes that request to acquire the write lock of the shared resource is 0 (where this is merely an example), the network interface card determines that the client can acquire the read lock of the shared resource; or if the lock acquisition request of the client is used to request to acquire write operation permission (that is, the write lock) of the shared resource, when the first quantity indicates that the write lock of the shared resource is in an idle state, and the second quantity indicates that the read lock of the shared resource is in the idle state, for example, the second quantity is 0, to be specific, the quantity of nodes that request to acquire the read lock of the shared resource is 0 (where this is merely an example), the network interface card determines that the client can acquire the write lock of the shared resource.

According to the foregoing method, after receiving the lock acquisition request of the client, the network interface card may quickly determine, based on the first quantity and the second quantity, whether the client can acquire the lock, so that a response speed is increased. In addition, in this application, the network interface card determines whether the client can acquire the lock of the shared resource, without participation of a CPU, so that CPU usage is reduced. This helps improve resource utilization of the CPU.

In a possible implementation, the network interface card sequentially acquires the lock acquisition request of the client from the cache queue of the lock of the shared resource. The cache queue includes a lock acquisition request of each access node that requests to acquire the lock of the shared resource. The lock acquisition request includes an identifier of the access node. The identifier is used to uniquely identify the access node. The access node includes the client.

According to the foregoing method, when receiving lock acquisition requests of a plurality of clients, the network interface card may cache the lock acquisition requests in the cache queue. In this way, the network interface card may orderly manage, by using the cache queue, lock acquisition requests of one or more nodes that request to acquire the lock of the shared resource. In addition, the client does not need to send the lock acquisition request to the serving device for a plurality of times to acquire the lock. Therefore, network resources are saved and bandwidth occupation is reduced. In addition, the network interface card may sequentially acquire the lock acquisition requests from the cache queue, to acquire a lock for a node queuing in the cache queue, so that a case of disorderly acquiring a lock is reduced, and a case in which the node that requests to acquire the lock of the shared resource is starved because the node does not acquire the lock for a long time is reduced.

In a possible implementation, the lock information further includes node state information and lock state information. The node state information indicates whether an access node has acquired the lock. The lock state information indicates whether the lock requested by the access node is in a lock released state. That the network interface card determines, based on lock information, whether the client can acquire a lock of the shared resource includes: If the network interface card determines, based on the node state information and the lock state information, that each access node that has acquired the lock of the shared resource is in the lock released state, the network interface card determines that the client can acquire the lock of the shared resource.

According to the foregoing method, the network interface card may determine, based on the lock information, the node that has acquired the lock of the shared resource, and whether the node has released the lock, to determine whether the lock requested by the client is in an idle state, and further determine whether the client can acquire the lock of the shared resource. In this manner, participation of a CPU is not required, so that CPU usage is reduced.

In a possible implementation, the lock acquisition success response includes lock location information. The lock location information indicates a location of the lock information of the client in a cache queue of the shared resource. In the method, the network interface card may further receive a lock release request sent by the client, where the lock release request is used to request to release the lock of the shared resource, and the lock release request includes the lock location information. The network interface card modifies, based on the lock location information, a state of the lock indicated by the lock location information in the cache queue to the lock released state.

According to the foregoing method, the network interface card may quickly locate the corresponding lock information in the cache queue based on the lock location information carried in the lock release request, and modify the recorded lock state to the lock released state, to release the lock for the client and increase a lock release speed.

In a possible implementation, if it is determined that the client that acquires the lock is faulty, the network interface card releases the lock of the client.

According to the foregoing method, the network interface card may actively release the lock of the client when detecting that the client that acquires the lock is faulty, to avoid a case in which the faulty client occupies the lock for a long time. Therefore, system performance may be improved.

According to a second aspect, an embodiment of this application further provides a lock management apparatus. The lock management apparatus has a function of implementing the network interface card in the method implementations of the first aspect. For beneficial effects, refer to the descriptions of the first aspect. Details are not described herein again. The function may be implemented by hardware, or may be implemented by hardware executing corresponding software. The hardware or the software includes one or more modules corresponding to the foregoing function. In a possible design, a structure of the lock management apparatus includes an acquiring module and a processing module. These modules may perform corresponding functions in the method implementations of the first aspect. For details, refer to the detailed descriptions in the method implementations. Details are not described herein again. For beneficial effects, refer to the descriptions of the first aspect. Details are not described herein again.

According to a third aspect, an embodiment of this application further provides a lock management apparatus. The lock management apparatus has a function of implementing the network interface card in the method implementations of the first aspect. For beneficial effects, refer to the descriptions of the first aspect. Details are not described herein again. A structure of the apparatus includes a processor and a memory, and optionally, may further include a communication interface. The processor is configured to support the lock management apparatus in performing a corresponding function in the method in the first aspect. The memory is coupled to the processor, and stores computer program instructions and data (for example, lock information of a shared resource) that are necessary for the communication apparatus. The structure of the lock management apparatus further includes the communication interface, configured to communicate with another device. For example, the communication interface may receive a lock acquisition request. For beneficial effects, refer to the descriptions of the first aspect. Details are not described herein again.

According to a fourth aspect, this application further provides a computer-readable storage medium. The computer-readable storage medium stores instructions. When the instructions are run on a computer, the computer is enabled to perform the method of the network interface card in the first aspect and the possible implementations of the first aspect. For beneficial effects, refer to the descriptions of the first aspect. Details are not described herein again.

According to a fifth aspect, this application further provides a computer program product including instructions. When the computer program product runs on a computer, the computer is enabled to perform the method of the network interface card in the first aspect and the possible implementations of the first aspect. For beneficial effects, refer to the descriptions of the first aspect. Details are not described herein again.

According to a sixth aspect, this application further provides a computer chip. The chip is connected to a memory, and the chip is configured to: read and execute a software program stored in the memory, to perform the method of the network interface card in the first aspect and the possible implementations of the first aspect. For beneficial effects, refer to the descriptions of the first aspect. Details are not described herein again.

According to a seventh aspect, an embodiment of this application further provides a computing device. The computing device includes a lock management apparatus. The lock management apparatus has a function of implementing the network interface card in the method implementations of the first aspect. For beneficial effects, refer to the descriptions of the first aspect. Details are not described herein again.

According to an eighth aspect, an embodiment of this application further provides a distributed system. The distributed system includes a client and a serving device. The serving device includes a lock management apparatus. The client is configured to send a lock acquisition request to the serving device, where the lock acquisition request is used to request to acquire access permission for a shared resource. The lock management apparatus of the serving device has a function of implementing the network interface card in the method implementations of the first aspect. For beneficial effects, refer to the descriptions of the first aspect. Details are not described herein again.

In this application, based on the implementations provided in the foregoing aspects, the implementations may be combined to provide more implementations.

BRIEF DESCRIPTION OF THE DRAWINGS

FIG. 3 is a schematic diagram of a frame structure of lock management information according to an embodiment of this application;

FIG. 4 is a schematic flowchart of a lock management method according to an embodiment of this application;

DETAILED DESCRIPTION OF ILLUSTRATIVE EMBODIMENTS

Figure 1:
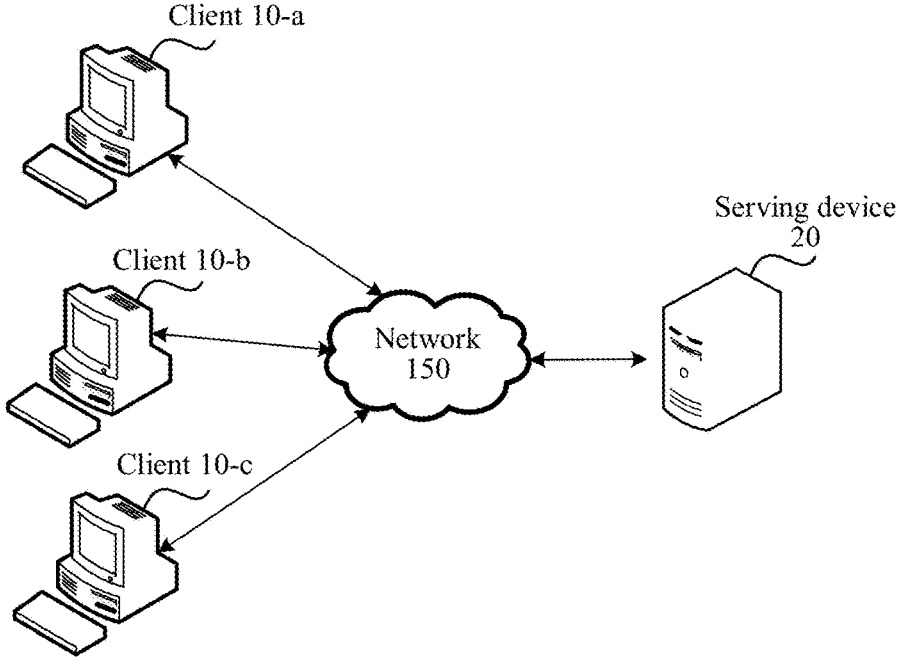
FIG. 1 is a schematic diagram of an architecture of a distributed system according to an embodiment of this application.

For ease of understanding a lock management method provided in embodiments of this application, concepts and terms used in embodiments of this application are first briefly described.

(1) A shared resource is a resource that can be shared by a plurality of objects. For example, data that is allowed to be allocated to a plurality of objects for sharing or storage space in which the data is located may be referred to as a shared resource. All of the plurality of objects may initiate an access operation such as reading or writing on the shared data. The plurality of objects may be different computer devices in a same communication system, or the plurality of objects may be a plurality of processes or a plurality of threads in a same computer device.

When the plurality of objects initiate the access operation on the same shared resource, generally, a lock is used to control the plurality of objects to orderly access the shared resource.

(2) The lock is a concept corresponding to the shared resource, and is used to control access permission for the shared resource. The access operation on the shared resource includes a read operation and a write operation. Correspondingly, a lock resource used to control the read operation may be referred to as a read lock, and a lock resource used to control the write operation is referred to as a write lock. An object that performs the write operation may be referred to as a writer, and an object that performs the read operation is referred to as a reader. Specifically, the writer needs to first acquire the write lock of the shared resource before performing the write operation on the shared resource. Similarly, the reader needs to acquire the read lock of the shared resource before performing the read operation on the shared resource. The write lock is exclusive. Only one writer is allowed to acquire the write lock at a time, in other words, only one writer is allowed to perform the write operation on the shared resource at a time. The read lock is shareable, and may be acquired by a plurality of readers at a time, in other words, the plurality of readers are allowed to simultaneously read data corresponding to the shared resource at a time. In addition, the read lock and the write lock cannot be allocated simultaneously. To be specific, at the same time, only one writer is allowed to perform the write operation on the same shared resource, or the plurality of readers are allowed to perform the read operation on the shared resource, to avoid a problem of data inconsistency.

The lock has at least two states: a lock acquired state and a lock released state. If an object acquires a lock, the lock is in the lock acquired state. After performing the access operation, the object that acquires the lock releases the lock. In this case, the lock of the object is in the lock released state. Because the write lock can be acquired by only one writer, the lock released state of the write lock may also be referred to as an idle state. For the read lock, a state of the read lock may be referred to as the idle state only after all of readers that acquire the read lock release the read lock.

To make the objectives, technical solutions, and advantages of this application clearer, the following further describes this application in detail with reference to the accompanying drawings. A specific operation method in a method embodiment may also be applied to an apparatus embodiment or a system embodiment.

FIG. 1 is a schematic diagram of an architecture of a distributed system according to an embodiment of this application. The system includes one or more clients 10 (where FIG. 1 shows three clients 10: 10-*a*, 10-*b*, and 10-*c*, but the system is not limited to the three clients 10) and a serving device 20.

The client 10 may be a computing device deployed on a user side, or software or a service on the computing device. The computing device includes a server (for example, an application server), a desktop computer, a notebook computer, a mobile terminal, or the like. A user may send a request to the serving device 20 via the client 10. The request is, for example, a lock acquisition request used to request to acquire a lock of a shared resource, or a lock release request used to request to release the lock of the shared resource. The client 10 and the serving device 20 may communicate with each other by using a network 150. The network 150 may be in a wired or wireless communication manner. For example, the network 150 usually represents any telecommunication or computer network, including, for example, an intranet, a wide area network (WAN), a local area network (LAN), a personal area network (PAN), an internet, or a wireless network (for example, Wi-Fi or a $5^{th}$ generation (5G) communication technology). Specifically, the client 10 may communicate with the serving device 20 by using a plurality of network protocols, for example, a transmission control protocol/an internet protocol (TCP/IP), a user datagram protocol (UDP)/an IP protocol, and a remote direct memory access (RDMA) protocol. In addition to the foregoing example of the network 150, the client 10 and the serving device 20 may also communicate with each other via a fiber channel switch. Alternatively, the fiber channel switch may be replaced with an Ethernet switch, an Infini-Band switch, a remote direct memory access over converged Ethernet (RoCE) switch, or the like.

The serving device 20 may be a computing device, for example, a server, a desktop computer, or another device. The serving device 20 may be configured to manage the lock of the shared resource, for example, allocate a lock resource to a client that requests to acquire the lock and release the lock for a client that requests to release the lock.

Figure 2:
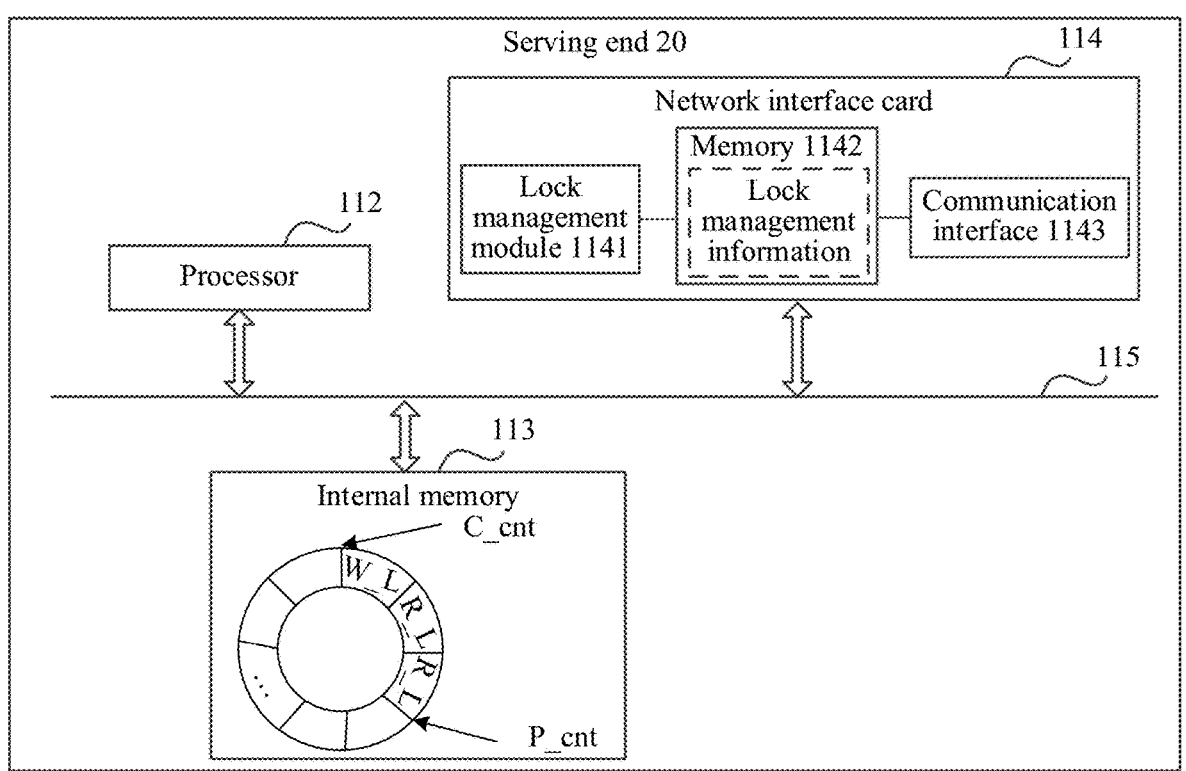
FIG. 2 is a schematic diagram of a structure of a serving device 20 according to an embodiment of this application.

FIG. 2 is a schematic diagram of a hardware structure of a serving device 20 according to an embodiment of this application. As shown in FIG. 2, the serving device 20 includes at least a processor 112, an internal memory 113, and a network interface card 114. The processor 112, the internal memory 113, and the network interface card 114 are connected through a bus 115. The bus 115 includes but is not limited to: a high-speed serial computer expansion bus standard (PCIe) bus, a double data rate (DDR) bus, a bus supporting multi-protocol interconnection, a serial advanced technology attachment (SATA) bus, a serial attached SCSI (SAS) bus, a controller area network CAN) bus, a compute express link (CXL) bus, a cache coherent interconnect for accelerators (CCIX) bus, and the like. For example, the processor 112 may be connected to the internal memory 113 through the DDR bus, and the network interface card 114 may be connected to the internal memory 113 through, but not limited to, the bus supporting multi-protocol interconnection, the PCIe bus, or the CCIX bus. In embodiments of this application, the serving device does not limit a bus protocol used between the components, and any connection manner or communication protocol that can enable the components to communicate with each other is applicable to embodiments of this application.

The processor 112 may be a central processing unit (CPU), an application-specific integrated circuit (ASIC), a field programmable gate array (FPGA), an artificial intelligence (AI) chip, a system on chip (SoC) or complex programmable logic device (CPLD), a graphics processing unit (GPU), a neural network processing unit (NPU), or the like.

The internal memory 113 is an internal memory that directly exchanges data with the processor 112. The internal memory 113 can read and written the data at a high speed at any time, and serves as a temporary data memory of an operating system or another running program. The internal memory 113 includes at least two types of memories. For example, the internal memory 113 may be a random access memory or a read-only memory (ROM). For example, the random access memory is a dynamic random access memory (DRAM) or a storage class memory (SCM). The internal memory may further include another random access memory, for example, a static random access memory (SRAM). For example, the read-only memory may be a programmable read-only memory (PROM) or an erasable programmable read-only memory (EPROM). In addition, the internal memory 113 may alternatively be a dual in-line memory module or a dual in-line memory module (DIMM), that is, a module formed by the DRAM. During actual application, a plurality of internal memories 113 and different types of internal memories 113 may be configured in the serving device 20. A quantity and types of the internal memories 113 are not limited in embodiments.

In embodiments of this application, the internal memory 113 may be configured to store one or more cache queues of a lock of a shared resource (where FIG. 2 shows only one cache queue of the lock of the shared resource, but this is not limited in this application). The cache queue is used to store access information of an access node (for example, a client 10) that requests to acquire the lock of the shared resource. As shown in FIG. 2, the cache queue sequentially stores access information of one writer and access information of two readers. The access information is used to record information such as information about the access node and a type (for example, a read lock or a write lock) of the lock requested by the access node. Details are described below, and are not repeated herein. It should be noted that, that the cache queue shown in FIG. 2 is located in a ring buffer of the internal memory 113 is merely an example. In this application, the cache queue may alternatively exist in the internal memory 113 in another form. This is not limited in embodiments of this application.

The network interface card 114 is configured to communicate with a component outside the serving 20 or a component inside the serving 20. In terms of hardware, still refer to FIG. 2. The network interface card 114 includes a lock management module 1141, a memory 1142, and a communication interface 1143. The lock management module 1141, the memory 1142, and the communication interface 1143 may be connected through a bus. For the bus herein, refer to the descriptions of the bus 115. Details are not described herein again.

The lock management module 1141 may be implemented by a hardware logic circuit, a processing core, an ASIC, an AI chip, or a programmable logic device (PLD). The PLD may be a complex programmable logic device (CPLD), a field programmable gate array (FPGA), generic array logic (GAL), a system on chip (SoC), or any combination thereof. Alternatively, the lock management module 1141 may be a software module, or a combination of the software module and a hardware module.

The lock management module 1141 can communicate with the client 10 through the communication interface 1143. For example, the communication interface 1143 may be configured to receive a lock acquisition request or a lock release request sent by the client 10. Alternatively, the lock management module 1141 may interact with another component (for example, the processor 112 or the internal memory 113) in the serving 20 through the communication interface 1143. For example, the communication interface 1143 may read data (for example, the access information in the cache queue) in the internal memory 113 through the bus 115. For example, the network interface card 114 may read, by using a direct memory access (DRM) protocol, the information included in the cache queue of the lock in the internal memory 113.

In this application, the lock management module 1141 may be further configured to: generate and manage the cache queue of the shared resource based on the received lock acquisition request/lock release request. For example, after the network interface card 114 receives a lock acquisition request sent by a client 10-a, the lock management module 1141 inserts, based on the lock acquisition request, access information of the client 10-a into a cache queue of a lock of a corresponding shared resource. If the lock management module 1141 receives lock acquisition requests of a plurality of access nodes for the shared resource, the lock management module 1141 may sequentially add, based on a sequence of receiving the lock acquisition requests, access information of the access nodes to the cache queue corresponding to the shared resource. For example, if the network interface card 114 sequentially receives the lock acquisition request sent by the client 10-a and a lock acquisition request sent by a client 10-b, the lock management module 1141 sequentially adds the access information of the client 10-a and access information of the client 10-b to the cache queue. The access information of the client 10-b is located after access information of the client 10-a. The following describes the access information in detail, and details are not described herein. The lock management module 1141 may further release a lock resource of a corresponding client in the cache queue based on the received lock release request. The following provides detailed descriptions.

The following describes the access information in detail, and details are not described herein. The lock management module 1141 may sequentially add the access information of the access nodes to an access queue in the sequence of receiving the lock acquisition requests. The lock management module 1141 may further release a lock resource of a corresponding entry in the access queue based on the lock release request received by the network interface card 114.

The memory 1142 is an internal memory that can directly exchange data with the lock management module 1141. The memory 1142 can read and write the data at a high speed at any time, and serves as a temporary data memory of a running program on the lock management module 1141. A hardware component of the memory 1142 is similar to that of the internal memory 113. For details, refer to the foregoing descriptions of the internal memory 113.

In an optional implementation, the memory 1142 may be configured to store lock management information corresponding to the shared resource. FIG. 3 is a schematic diagram of a frame structure of lock management information according to an embodiment of this application. As shown in FIG. 3, the lock management information includes but is not limited to one or more of the following parameters: a quantity of readers (Rlock_cnt), a quantity of writers (Wlock_cnt), a head pointer (C_cnt) of the cache queue, and a tail pointer (P_cnt) of the cache queue. The quantity of readers is a quantity of readers that request to acquire the read lock of the shared resource. For example, each time the quantity of readers is increased by one, a count is increased by 1, and each time the quantity of readers is reduced by one, the count is reduced by 1. For example, in an implementation, each time the network interface card 114 receives a lock acquisition request for requesting to acquire the read lock, the count is increased by 1. It should be noted that repeated lock acquisition requests of a same client are recorded only once. Similarly, when the network interface card 114 receives a lock release request sent by the reader, the count is reduced by 1 after lock release succeeds. Similarly, the quantity of writers is a quantity of writers that request to acquire the write lock of the shared resource. For a counting manner of the parameter, refer to the foregoing descriptions. Details are not described herein again. The lock management information may be managed by the lock management module 1141. For example, a value of each parameter in the lock management information may be 16 bits (which is merely an example, and this is not limited in this application), that is, the lock management information is 64-bit atomic data. A data amount of the lock management information is small, and the lock management information does not occupy a large amount of storage space. Therefore, the memory 1142 is capable of storing the lock management information, and the network interface card 114 may implement the function without capacity expansion. In this way, the design has strong applicability and compatibility.

It should be noted that, (1) FIG. 1 shows an example in which the client 10 is a desktop computer and the serving device 20 is a server. Actually, specific forms of the client 10 and the serving device 20 are not limited in embodiments of this application. (2) The structure of the serving device 20 shown in FIG. 2 is merely an example. In an actual product, the serving 20 or the network interface card 114 may have more or fewer components. For example, the serving device 20 may further include a hard disk and an input/output device such as a keyboard, a mouse, or a display screen. For example, the hard disk is a non-volatile memory such as a ROM, a hard disk drive (HDD), or a solid-state drive (SSD). For another example, the network interface card 114 may include the foregoing hard disk. Specific structures of the serving device 20 and the network interface card 114 are not limited in embodiments of this application. (3) That the cache queue shown in FIG. 2 is stored in the internal memory 113 is merely an example. In another optional implementation, the cache queue may be further stored in the memory 1142 of the network interface card. It may be understood that, this manner has a specific requirement on a capacity of the memory 1142. In an implementation, a cache queue frequently accessed by the network interface card 114 may be placed in the memory 1142, to increase a speed of acquiring the cache queue by the lock management module 1141, and reduce a delay.

The following uses the system shown in FIG. 1 and the structure of the serving device 20 shown in FIG. 2 as examples to describe the lock management method provided in embodiments of this application. For ease of description, in the following embodiments of this application, an example in which the network interface card 114 of the serving device 20 performs the lock management method provided in embodiments of this application is used for description. The lock management method is described from two aspects: acquiring a lock for the client 10 (step 401 to step 403 or step 406 to step 408) and releasing the lock for the client 10 (step 404 and step 405).

FIG. 4 is a schematic flowchart of a lock management method according to an embodiment of this application. As shown in FIG. 4, the method includes the following steps.

Step 401: A network interface card 114 receives a lock acquisition request sent by a client 10 (for example, a client 10-a).

The lock acquisition request is used to request to acquire a lock of a shared resource. Specifically, information carried in the lock acquisition request includes but is not limited to one or more of the following: a type (for example, a write lock or a read lock) of the lock requested by the client 10, a node identifier (used to uniquely identify a client) of the client 10, and address information of the lock (for example, an address of a cache queue of the lock in an internal memory).

Step 402a: The network interface card 114 determines, based on lock management information, whether the client 10 can acquire the lock of the shared resource. If the client 10 can acquire the lock of the shared resource, step 403 is performed.

The network interface card 114 may determine, based on Rlock_cnt and Wlock_cnt in the lock management information, whether the client 10 can acquire the lock. For example, if the lock acquisition request is used to request to acquire the write lock of the shared resource, and if Wlock_cnt indicates that the write lock is in an idle state, and Rlock_cnt indicates that the read lock of the shared resource is in the idle state, it is determined that the client 10 can acquire the write lock. For another example, if the lock acquisition request is used to request to acquire the read lock of the shared resource, because the read lock can be shared, if Wlock_cnt indicates that the write lock of the shared resource is in an idle state, in other words, provided that the write lock of the shared resource is in the idle state, it may be determined that the client 10 can acquire the read lock.

Specifically, if Wlock_cnt is used to record a quantity of writers in the cache queue corresponding to the shared resource, and if the quantity of writers in the cache queue is 0, it indicates that the write lock of the shared resource is in the idle state. Similarly, if Rlock_cnt is used to record a quantity of readers in the cache queue, and if the quantity of readers is 0, it indicates that the read lock of the shared resource is in the idle state.

Step 402b: The network interface card 114 updates the cache queue of the lock of the shared resource based on the lock acquisition request of the client 10.

In this application, regardless of whether the client 10 can acquire the lock of the shared resource, the network interface card 114 may add access information of the client 10 to the cache queue of the shared resource. This operation may be referred to as enqueuing. For ease of understanding, before a process of enqueuing is described, the cache queue is first described in detail. As described above, the cache queue is used to sequentially arrange access information of one or more access nodes that request to acquire the lock of the shared resource. Each piece of access information may include but is not limited to one or more of the following:

(1) a node identifier, which is an identifier of the access node (for example, the client) and is used to uniquely identify an access node;

(2) a lock type, which is a type of the lock that the access node requests to acquire and includes the read lock and the write lock;

(3) node state information, indicating whether the access node has acquired the requested lock and including acquired and not acquired (not acquired);

(4) lock state information, indicating whether the access node has released the lock and including a lock acquired state (active) and a lock released state (inactive); and (5) a location identifier (or referred to as a location index), indicating a location of the access information in a ring buffer. For example, the location identifier may be an index of an entry in the ring buffer. It is assumed that the ring buffer has a maximum of eight entries, and each entry is used to store one piece of access information. An entry number may start from a preset initial value, for example, 0, and each entry number is incremented by 1 in sequence. For example, the eight entries are numbered sequentially from to 7. After the eight entries are fully occupied, if a location of the number 0 is released, new access information may be inserted into the entry, and the entry is sequentially numbered as 9. A number of a next entry after the number 9 is 10. The rest is deduced by analogy.

For example, a process in which the network interface card 114 enqueues the access information of the client 10 may include: The network interface card 114 finds, based on a tail pointer P_cnt in the lock management information corresponding to the shared resource, a queue tail of the cache queue corresponding to the shared resource in the ring buffer of the internal memory 113, and adds the access information of the client 10 to a next blank entry of the queue tail. If the client 10 can acquire the lock, in the access information of the client 10, the node state information is acquired, the lock state information is active, and another parameter may be generated based on the lock acquisition request, or is a default value. Details are not described herein. If the client 10 cannot acquire the lock, in the access information of the client 10, the node state information is not acquired, and another parameter may be a default value. The network interface card 114 is further configured to maintain the lock management information. If the client 10 requests to acquire the write lock, a count of Wlock_cnt is increased by 1; if the client requests to acquire the read lock, a count of Rlock_cnt is increased by 1. In addition, the tail pointer P_cnt is updated based on an updated cache queue. An updated tail pointer points to an entry in which the access information of the client is located.

It should be noted that step 402b is an optional step, and is not a mandatory step. In addition, step 402b may be performed before step 402a, or may be performed after step 402a, or step 402a and step 402b may be performed simultaneously. This is not limited in this embodiment of this application. If step 402b is performed before step 402a, because the access information of the client 10 is first enqueued, when it is determined, based on the lock management information, whether the client 10 can acquire the lock, if the client 10 requests to acquire the write lock, Wlock_cnt=1 indicates that the write lock is in the idle state, and Rlock_cnt=0 indicates that the read lock is in the idle state; or if the client 10 requests to acquire the read lock, Wlock_cnt=0 indicates that the write lock is idle, and Rlock_cnt=1 indicates that the read lock is idle. In the foregoing design, when receiving lock acquisition requests of a plurality of access nodes, the network interface card may use the cache queue to manage the lock acquisition requests of the access nodes. For example, the network interface card 114 may sequentially add the received lock acquisition requests to the cache queue, so that the network interface card 114 can acquire, based on a sequence in the cache queue, a lock for an access node that requests a lock resource. In this way, the client does not need to interact with a serving device 20 for a plurality of times, blind competition of the client for the lock resource is avoided, and a quantity of interactions between the client and the network interface card 114 can be reduced. This helps reducing network resource overheads. Locks are acquired for the clients sequentially.

Step 403: The network interface card 114 sends a lock acquisition success response to the client 10, where the lock acquisition success response indicates that the client 10 successfully acquires the lock of the shared resource.

The network interface card 114 sends the lock acquisition success response to the client 10, to notify the client 10 to acquire the write lock or the read lock of the shared resource. Correspondingly, after receiving the lock acquisition success response, the client 10 may perform a write operation or a read operation on the shared resource.

In an optional manner, if step 402b is performed, in step 403, the lock acquisition success response may further include a location identifier indicating a location of the access information of the client 10 in the cache queue. The location identifier may be returned together with a lock release request sent by the client 10, so that the network interface card 114 quickly locates, in the cache queue, an entry in which the client 10 is located, to accelerate a lock release speed.

In the foregoing manner, after receiving the lock acquisition request of the client 10, the network interface card 114 may quickly determine, based on the lock management information, whether the client 10 can acquire the lock. In other words, the network interface card 114 determines whether the client 10 can acquire the lock of the shared resource, without participation of a CPU 112, so that usage of the CPU 112 is reduced. This helps improve resource utilization of the CPU 112. Further, because the lock management information may be stored in a memory 1142 of the network interface card 114, a lock management module 1141 does not need to access the lock management information across a bus, to increase a speed of acquiring the lock management information, reduce a response delay, and improve system performance.

The following describes a lock release process.

Step 404: The network interface card 114 receives the lock release request sent by the client 10 (for example, the client 10-*a*).

The lock release request is used to request to release the lock of the shared resource. Specifically, information carried in the lock release request includes but is not limited to one or more of the following: a type (for example, the write lock or the read lock) of the lock that the client 10 requests to release, the node identifier (used to uniquely identify an access node) of the client 10, the address information of the lock (for example, the address of the cache queue of the lock in the internal memory), and the location identifier (acquired from the lock acquisition response and recorded) of the access information of the client in the cache queue.

Step 405: The network interface card 114 releases the lock for the client 10.

Specifically, the network interface card 114 modifies, based on the location identifier carried in the lock release request, lock state information in an entry at a corresponding location in the cache queue to inactive, to mark that the client has released the lock. In addition, the network interface card 114 may further send a lock release response (not shown in FIG. 4) to the client 10.

In addition, the network interface card 114 updates the lock management information based on the lock release request. If the lock release request is used to request to release the write lock, the count of Wlock_cnt is reduced by 1. If the access information of the client is arranged at a queue head of the cache queue, a head pointer (C_cnt) may further be updated, so that updated C_cnt points to a next entry of the cache queue. Similarly, if the lock release request is used to request to release the read lock, the count of Rlock_cnt is reduced by 1. The read lock can be shared, and each reader requires different time to perform the read operation. Therefore, C_cnt and P_cnt may be updated after all of readers that acquire the read lock release the read lock.

In an optional implementation, a state of the client 10 may be detected. For example, whether the client 10 is normal is detected via a heartbeat. If it is detected that the client 10 that acquires the lock is faulty, the network interface card 114 may be notified to release the lock for the faulty client 10 and update the lock management information. For a specific implementation, refer to the foregoing descriptions. Details are not described herein again. Based on the design, a case in which the faulty client 10 occupies the lock for a long time can be avoided, thereby improving system reliability and performance. It should be noted that the operation of monitoring the state of the client 10 may be performed throughout an entire method implementation process, and is not limited to step 405. This is not limited in this embodiment of this application. In addition, heartbeat detection on the client 10 may be performed by the processor 112, the network interface card 114, or another node, for example, another serving device (where the another serving device may communicate with the serving device 20). This is not limited in this embodiment of this application.

Step 406: The network interface card 114 determines whether the write lock and the read lock of the shared resource are both idle. If the write lock and the read lock of the shared resource are both idle, step 407 is performed.

After releasing the lock for the client 10, the network interface card 114 first determines whether the write lock and the read lock of the shared resource are both in the idle state. If the write lock and the read lock of the shared resource are both in the idle state, the network interface card 114 may acquire a lock for a remaining access node that does not acquire the lock. The following describes, by using two cases, how to determine whether the write lock and the read lock of the shared resource are both in the idle state.

Case 1: The lock release request is a request for releasing the write lock. It should be understood that, the write lock is exclusive, and only one access node can acquire the write lock at a time. Therefore, it may be determined that after the network interface card 114 releases the write lock of the client 10, the write lock and the read lock of the shared resource are both in the idle state.

Case 2: The lock release request is a request for releasing the read lock. The read lock can be shared, and all of a plurality of readers may acquire the read lock. Therefore, in an implementation, the network interface card 114 sequentially reads a part or all of the access information from the head of the cache queue (to the tail) based on the head pointer (C_cnt) of the cache queue and the tail pointer (P_cnt) of the cache queue. If it is determined, based on the acquired access information, that all of readers that acquire the lock have released the lock (in other words, lock state information in access information whose node state information is acquired is inactive), it is determined that the write lock and the read lock of the shared resource are both in the idle state. If lock state information in one or more pieces of access information whose node state information is acquired is active, in other words, there is a reader acquiring the read lock, the network interface card 114 may repeat the process of step 404 to step 406, until all of readers that acquire the read lock release the lock. In another implementation, the network interface card 114 may further determine, based on the lock management information, whether the write lock and the read lock are both idle. Refer to the foregoing related descriptions. Details are not described herein again.

Step 407: The network interface card determines, based on the cache queue of the shared resource, an access node that can acquire the lock.

The network interface card 114 sequentially reads a part or all of the access information from the head of the cache queue based on the head pointer (C_cnt) of the cache queue and the tail pointer (P_cnt) of the cache queue.

If a first access node that is arranged in the cache queue and that does not acquire the lock requests to acquire the write lock, it is determined that the access node can acquire the write lock. It should be noted that in this case, the network interface card 114 needs to read only the first piece of access information of the cache queue, and does not need to read all of the access information, to reduce network resource overheads.

If the first access node that is arranged in the cache queue and that does not acquire the lock requests to acquire the read lock, because the read lock can be shared, in an implementation, all of readers that do not acquire the lock in the cache queue can acquire the read lock. For example, assuming that a location identifier of the first access node that does not acquire the lock in the cache queue is 9, and access information of a location identifier 12 and access information of a location identifier 13 both indicate readers that do not acquire the lock, the readers can acquire the read lock. This manner can improve read performance.

To avoid a case in which the writer cannot acquire a lock for a long time, in another implementation, in the cache queue, only a plurality of consecutive readers starting from the first access node that does not acquire the lock can acquire the read lock. For example, it is assumed that a location identifier of the first access node that does not acquire the lock in the cache queue is 9. If access information of a subsequent location identifier 10 and access information of a subsequent location identifier 11 both indicate readers that do not acquire the lock, and access information of a location identifier 12 is a writer that does not acquire the lock, all of the three readers with the location identifier 9 to the location identifier 11 can acquire the read lock. In this manner, the read performance can be improved and impact on the writer can be reduced on the basis of ensuring sequential lock acquisition.

Step 408: For any determined access node that can acquire the lock, the network interface card 114 sends the lock acquisition response to the access node, to indicate that the access node successfully acquires the lock.

It may be understood that in the system shown in FIG. 1, the access node herein is the client.

In the foregoing manner, after the network interface card 114 receives the lock release request of the client 10, the network interface card 114 releases the lock resource. Then, the network interface card reads the access information from the cache queue, to determine the access node that can acquire the lock of the shared resource. In addition, the network interface card 114 may sequentially acquire a lock for the access node queuing in the cache queue, to reduce a case of disorderly acquiring a lock and avoid a case in which the access node that requests the lock of the shared resource is starved. In addition, the network interface card 114 determines whether the access node can acquire the lock, without participation of the CPU, so that CPU usage is reduced. This helps improve resource utilization of the CPU.

Figure 5:
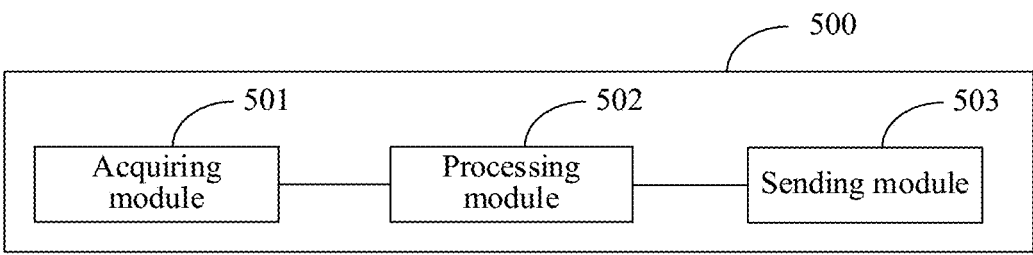
FIG. 5 is a schematic diagram of a structure of a lock management apparatus according to an embodiment of this application.

Based on a same concept as the method embodiment, an embodiment of this application further provides a lock management apparatus. The lock management apparatus is configured to perform the method performed by the network interface card 114 in the method embodiment shown in FIG. 4. As shown in FIG. 5, the lock management apparatus 500 includes an acquiring module 501, a processing module 502, and a sending module 503. Specifically, in the lock management apparatus 500, each module directly establishes a connection through a communication path.

The acquiring module 501 is configured to acquire a lock acquisition request of a client, where the lock acquisition request is used to request to acquire access permission for a shared resource. For a specific implementation, refer to the descriptions of step 401 in FIG. 4. Details are not described herein again.

The processing module 502 is configured to determine, based on recorded lock information, whether the client can acquire a lock of the shared resource. For a specific implementation, refer to the descriptions of step 402 in FIG. 4, or refer to the descriptions of step 406. Details are not described herein again. When it is determined that the client can acquire the lock of the shared resource, a lock acquisition success response is sent to the client via the sending module 503, where the lock acquisition success response indicates that the client successfully acquires the lock of the shared resource. For a specific implementation, refer to the descriptions of step 403 in FIG. 4. Details are not described herein again.

In a possible implementation, when acquiring the lock acquisition request of the client, the acquiring module 501 is specifically configured to: receive the lock acquisition request of the client; or acquire the lock acquisition request of the client from a cache queue.

In a possible implementation, the lock information includes a first quantity of nodes that request to acquire a write lock of the shared resource and a second quantity of nodes that request to acquire a read lock of the shared resource. When determining, based on the lock information, whether the client can acquire the lock of the shared resource, the processing module 502 is specifically configured to: when the first quantity indicates that the write lock of the shared resource is in an idle state, determine that the client can acquire the read lock of the shared resource; or when the first quantity indicates that the write lock of the shared resource is in an idle state, and the second quantity indicates that the read lock of the shared resource is in the idle state, determine that the client can acquire the write lock of the shared resource.

In a possible implementation, the lock information further includes lock state information and node state information. The lock state information indicates whether the lock applied by an access node is in a lock released state. The node state information indicates whether the access node has acquired the lock. When determining, based on the lock information, whether the client can acquire the lock of the shared resource, the processing module 502 is specifically configured to: if it is determined, based on the node state information and the lock state information, that each access node that has acquired the lock of the shared resource is in the lock released state, determine that the client can acquire the lock of the shared resource.

In a possible implementation, the lock acquisition response includes lock location information. The lock location information indicates a location of the lock information of the client in the cache queue. The acquiring module 501 is further configured to receive a lock release request sent by the client, where the lock release request is used to request to release the lock of the shared resource, and the lock release request includes the lock location information. For a specific implementation, refer to the descriptions of step 404 in FIG. 4. Details are not described herein again. The processing module 502 is further configured to modify, based on the lock location information, a state of the lock indicated by the lock location information in the cache queue to the lock released state. For a specific implementation, refer to the descriptions of step 405 in FIG. 4. Details are not described herein again.

In a possible implementation, the processing module 502 is further configured to: if it is determined that the client that acquires the lock is faulty, release the lock of the client.

Figure 6:
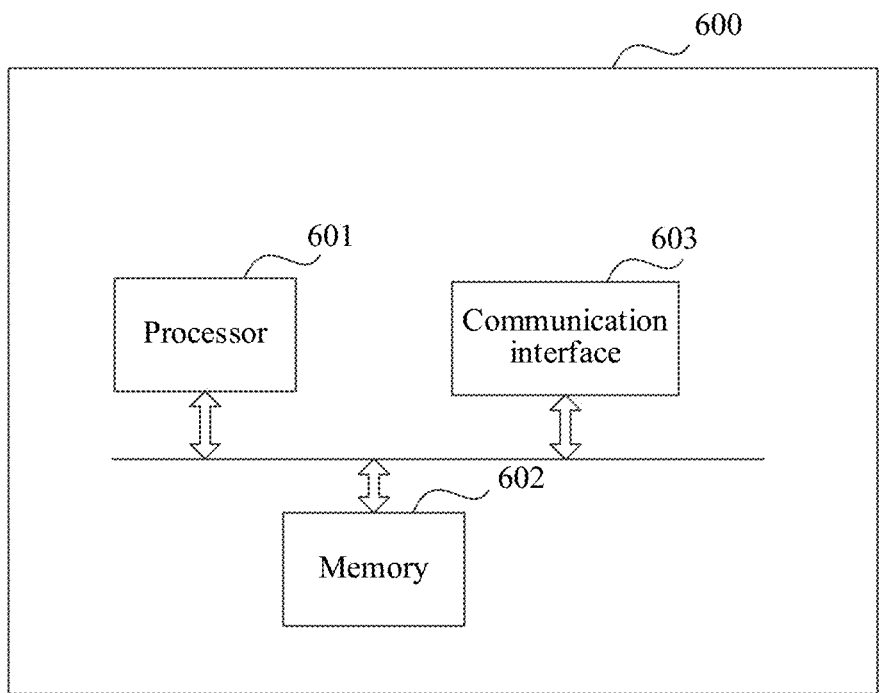
FIG. 6 is a schematic diagram of a structure of another lock management apparatus according to an embodiment of this application.

In a simple embodiment, a person skilled in the art may figure out that the network interface card 114 in the embodiment shown in FIG. 4 may use the form shown in FIG. 6.

A lock management apparatus 600 shown in FIG. 6 includes at least one processor 601 and a memory 602, and optionally, may further include a communication interface 603.

The memory 602 may be a volatile memory, for example, a random access memory. Alternatively, the memory may be a non-volatile memory, for example, a read-only memory, a flash memory, an HDD, or an SSD. Alternatively, the memory 602 is any other medium that can be used to carry or store expected program code in an instruction or data structure form and that can be accessed by a computer. However, this is not limited. The memory 602 may be a combination of the foregoing memories.

In this embodiment of this application, a specific connection medium between the processor 601 and the memory 602 is not limited.

The processor 601 may be a central processing unit, or the processor 601 may be another general-purpose processor, a digital signal processor (DSP), an application-specific integrated circuit (ASIC), a field programmable gate array (FPGA) or another programmable logic device, a discrete gate or transistor logic device, a discrete hardware component, an artificial intelligence chip, an on-chip chip, or the like. The general-purpose processor may be a microprocessor, any conventional processor, or the like. When communicating with another device, the processor 601 may perform data transmission through the communication interface 603, for example, receive a lock acquisition request or a lock release request.

When the apparatus uses the form shown in FIG. 6, the processor 601 in FIG. 6 may invoke computer-executable instructions stored in the memory 602, to enable the lock management apparatus s to perform the method performed by the network interface card 114 in any one of the foregoing method embodiments.

Specifically, functions/implementation processes of the acquiring module 501, the processing module 502 and the sending module 503 in FIG. 5 may all be implemented by the processor 601 in FIG. 6 by invoking the computer-executable instructions stored in the memory 602.

An embodiment of this application further provides a computer storage medium. The computer storage medium stores computer instructions. When the computer instructions are run on a lock management apparatus, the lock management apparatus is enabled to perform the foregoing related method steps, to implement the method performed by the network interface card 114 in the foregoing embodiments. For details, refer to the descriptions of the steps in FIG. 4. Details are not described herein again.

An embodiment of this application further provides a computer program product. When the computer program product runs on a computer, the computer is enabled to perform the foregoing related steps, to implement the method performed by the network interface card 114 in the foregoing embodiments. For details, refer to the descriptions of the steps in FIG. 4. Details are not described herein again.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the method performed by the network interface card 114 in the foregoing method embodiments. For details, refer to the descriptions of the steps in FIG. 4. Details are not described herein again.

The storage device, the computer storage medium, the computer program product, or the chip provided in embodiments of this application may be configured to perform the method corresponding to the network interface card 114 provided above. Therefore, for beneficial effects that can be achieved by the storage device, the computer storage medium, the computer program product, or the chip, refer to the beneficial effects of the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed in different places. Some or all of the units may be selected based on actual requirements to achieve the objectives of the solutions of embodiments.

In addition, the functional units (or the modules) in embodiments of this application may be integrated into one processing unit, each unit may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes various media that can store program code, such as a USB flash drive, a removable hard disk, a read-only memory (ROM), a random access memory (RAM), a magnetic disk, or an optical disc.

Optionally, the computer-executable instructions in embodiments of this application may also be referred to as application program code. This is not specifically limited in embodiments of this application.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information into the storage medium. Optionally, the storage medium may be integrated into the processor. The processor and the storage medium may be disposed in the ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the scope of this application. In this way, this application is intended to cover these modifications and variations of this application provided that they fall within the scope of protection of the claims of this application and their equivalent technologies.

What is claimed is:

1. A method, comprising:

acquiring, by a network interface card of a serving device, a lock acquisition request of a client, wherein the lock acquisition request requests to acquire access permission for a shared resource, wherein the network interface card is coupled by at least one bus to at least one central processing unit and at least one memory of the serving device, the at least one memory of the serving device directly exchanges data with the at least one central processing unit, and wherein the network interface card comprises at least one internal memory storing lock information of the shared resource, the at least one memory of the serving device stores a cache queue of a lock of the shared resource, and the lock information of the shared resource that is stored in the at least one internal memory of the network interface card comprises information of whether a write lock of the shared resource is in an idle state and information of whether a read lock of the shared resource is in an idle state and at least one pointer that points to the cache queue of the lock of the shared resource stored in the at least one memory of the serving device;

determining, by the network interface card, and based on the information of whether the write lock of the shared resource is the idle state or the information of whether the read lock of the shared resource is in the idle state that is stored in the at least one internal memory of the network interface card, and without participation of the at least one central processing unit, whether the client is enabled to acquire the lock of the shared resource;

updating, by the network interface card, the cache queue of the lock of the shared resource stored in the at least one memory of the serving device according to the determining of whether the client is enabled to acquire the lock of the shared resource; and in response to determining that the client is enabled to acquire the lock of the shared resource, sending, by the network interface card, a lock acquisition success response to the client, wherein the lock acquisition success response indicates that the client successfully acquires the lock of the shared resource;

wherein the information of whether the write lock of the shared resource is in the idle state comprises a first quantity of nodes that request to acquire a write lock of the shared resource and the information of whether the read lock of the shared resource is in the idle state comprises a second quantity of nodes that request to acquire a read lock of the shared resource, wherein the network interface card updates the first quantity of nodes in response to a request to acquire the write lock of the shared resource or a request to release the write lock of the shared resource, and the network interface card updates the second quantity of nodes in response to a request to acquire the read lock of the shared resource or a request to release the read lock of the shared resource; and wherein determining, by the network interface card and based on the information of whether the write lock of the shared resource is in the idle state and the information of whether the read lock of the shared resource is in the idle state that are stored in the at least one internal memory of the network interface card, and without participation of the at least one central processing unit, whether the client is enabled to acquire the lock of the shared resource comprises:

when the first quantity indicates that the write lock of the shared resource is in the idle state, determining, by the network interface card, that the client is enabled to acquire the read lock of the shared resource.

2. The method according to claim 1, wherein determining, by the network interface card and based on the information of whether the write lock of the shared resource is in the idle state and the information of whether the read lock of the shared resource is in the idle state that are stored in the at least one internal memory of the network interface card, and without participation of the at least one central processing unit, whether the client is enabled to acquire the lock of the shared resource further comprises:

in response to the first quantity indicating that the write lock of the shared resource is in the idle state, and the second quantity indicating that the read lock of the shared resource is in the idle state, determining, by the network interface card, that the client is enabled to acquire the write lock of the shared resource.

3. The method according to claim 1, wherein the cache queue of the lock of the shared resource stored in the at least one memory of the serving device comprises lock state information and node state information, the node state information indicates whether an access node has acquired the lock, and the lock state information indicates whether the lock applied by the access node is in a lock released state.

4. The method according to claim 3, wherein the lock acquisition success response comprises lock location information, and the lock location information indicates a location of the lock information of the client in the cache queue; and the method further comprises:

receiving, by the network interface card, a lock release request sent by the client, wherein the lock release request is used to request to release the lock of the shared resource, and the lock release request comprises the lock location information; and modifying, by the network interface card and based on the lock location information, a state of the lock indicated by the lock location information in the cache queue to the lock released state.

5. The method according to claim 1, wherein acquiring, by the network interface card of the serving device, the lock acquisition request of the client comprises:

receiving, by the network interface card, the lock acquisition request sent by the client.

6. The method according to claim 1, wherein acquiring, by the network interface card of the serving device, the lock acquisition request of the client comprises:

acquiring, by the network interface card, the lock acquisition request of the client from the cache queue.

7. The method according to claim 1, wherein the at least one pointer that points to the cache queue of the lock of the shared resource stored in the at least one memory of the serving device comprises a head pointer and a tail pointer of the cache queue.

8. The method according to claim 7, wherein the cache queue is stored in a ring buffer of the at least one memory.

9. An apparatus, wherein the apparatus comprises at least one processor and at least one memory, wherein the at least one memory stores computer program instructions that, when executed by the at least one processor, cause the apparatus to:

acquire, using a network interface card of the apparatus, a lock acquisition request of a client, wherein the lock acquisition request requests to acquire access permission for a shared resource, and the network interface card is coupled by at least one bus to at least one central processing unit of the apparatus and at least one memory of the apparatus, and the at least one memory of the apparatus directly exchanges data with the at least one central processing unit;

determine, using the network interface card and based on lock information stored in at least one internal memory of the network interface card, and without participation of the at least one central processing unit, whether the client is enabled to acquire a lock of the shared resource, wherein the at least one memory of the apparatus stores a cache queue of a lock of the shared resource, and the lock information of the shared resource that is stored in the at least one internal memory of the network interface card comprises information of whether a write lock of the shared resource is in an idle state and information of whether a read lock of the shared resource is in an idle state and at least one pointer that points to the cache queue of the lock of the shared resource stored in the at least one memory of the apparatus;

update, using the network interface card, the cache queue of the lock of the shared resource according to the determining of whether the client is enabled to acquire the lock of the shared resource; and in response to determining that the client is enabled to acquire the lock of the shared resource, send, using the network interface card, a lock acquisition success response to the client, wherein the lock acquisition success response indicates that the client successfully acquires the lock of the shared resource;

wherein the information of whether the write lock of the shared resource is in the idle state comprises a first quantity of nodes that request to acquire a write lock of the shared resource and the information of whether the read lock of the shared resource is in the idle state comprises a second quantity of nodes that request to acquire a read lock of the shared resource, wherein the network interface card updates the first quantity of nodes in response to a request to acquire the write lock of the shared resource or a request to release the write lock of the shared resource, and the network interface card updates the second quantity of nodes in response to a request to acquire the read lock of the shared resource or a request to release the read lock of the shared resource; and wherein to determine, based on the lock information stored in at least one internal memory of the network interface card, and without participation of the at least one central processing unit, whether the client is enabled to acquire the lock of the shared resource, the computer program instructions, when executed by the at least one processor, cause the apparatus to:

in response to the first quantity indicating that the write lock of the shared resource is in the idle state, determine that the client is enabled to acquire the read lock of the shared resource.

10. The apparatus according to claim 9, wherein to determine, based on the lock information stored in at least one internal memory of the network interface card, and without participation of the at least one central processing unit, whether the client is enabled to acquire the lock of the shared resource, the computer program instructions, when executed by the at least one processor, further cause the apparatus to:

in response to the first quantity indicating that the write lock of the shared resource is in the idle state, and the second quantity indicating that the read lock of the shared resource is in the idle state, determine that the client is enabled to acquire the write lock of the shared resource.

11. The apparatus according to claim 9, wherein the cache queue of the lock of the shared resource stored in the at least one memory of the apparatus comprises lock state information and node state information, the node state information indicates whether an access node has acquired the lock, and the lock state information indicates whether the lock applied by the access node is in a lock released state.

12. The apparatus according to claim 11, wherein the lock acquisition success response comprises lock location information, and the lock location information indicates a location of the lock information of the client in the cache queue; and wherein the computer program instructions, when executed by the at least one processor, further cause the apparatus to:

receive a lock release request sent by the client, wherein the lock release request is used to request to release the lock of the shared resource, and the lock release request comprises the lock location information; and modify, based on the lock location information, a state of the lock indicated by the lock location information in the cache queue to the lock released state.

13. The apparatus according to claim 9, wherein to acquire, by the network interface card, the lock acquisition request of the client, the computer program instructions, when executed by the at least one processor, cause the apparatus to:

acquire, by the network interface card, the lock acquisition request of the client from the cache queue.

14. The apparatus according to claim 9, wherein the at least one pointer that points to the cache queue of the lock of the shared resource stored in the at least one memory comprises a head pointer and a tail pointer of the cache queue.

15. A distributed system, wherein the distributed system comprises a client and a serving device, and the serving device comprises a lock management apparatus, wherein the client is configured to send a lock acquisition request to the serving device, wherein the lock acquisition request requests to acquire access permission for a shared resource; and wherein the lock management apparatus comprises a network interface card comprising at least one internal memory, and at least one processor, and wherein the network interface card is coupled by at least one bus to at least one central processing unit of the serving device and at least one memory of the serving device, the at least one memory of the serving device directly exchanges data with the at least one central processing unit, and the at least one memory of the serving device stores a cache queue of the shared resource;

wherein the at least one internal memory stores lock information of the shared resource and computer program instructions that, when executed by the at least one processor, cause the lock management apparatus to:

acquire the lock acquisition request of the client;

determine, based on the lock information stored in the at least one internal memory of the network interface card, and without participation of the at least one central processing unit, whether the client is enabled to acquire a lock of the shared resource;

update the cache queue of the lock of the shared resource according to the determining of whether the client is enabled to acquire the lock of the shared resource, wherein the lock information of the shared resource that is stored in the at least one internal memory of the network interface card comprises information of whether a write lock of the shared resource is in an idle state and information of whether a read lock of the shared resource is in an idle state and at least one pointer that points to the cache queue of the lock of the shared resource stored in the at least one memory of the serving device; and in response to determining that the client is enabled to acquire the lock of the shared resource, send a lock acquisition success response to the client, wherein the lock acquisition success response indicates that the client successfully acquires the lock of the shared resource;

wherein the information of whether the write lock of the shared resource is in the idle state comprises a first quantity of nodes that request to acquire a write lock of the shared resource and the information of whether the read lock of the shared resource is in the idle state comprises a second quantity of nodes that request to acquire a read lock of the shared resource, wherein the lock management apparatus is configured to update the first quantity of nodes in response to a request to acquire the write lock of the shared resource or a request to release the write lock of the shared resource, and the lock management apparatus is configured to update the second quantity of nodes in response to a request to acquire the read lock of the shared resource or a request to release the read lock of the shared resource; and wherein to determine, based on the lock information stored in the at least one internal memory, whether the client is enabled to acquire the lock of the shared resource, the lock management apparatus is caused to:

in response to the first quantity indicating that the write lock of the shared resource is in the idle state, determine that the client is enabled to acquire the read lock of the shared resource.

16. The distributed system according to claim 15, wherein to determine, based on the lock information stored in the at least one internal memory, whether the client is enabled to acquire the lock of the shared resource, the lock management apparatus is further caused to:

in response to the first quantity indicating that the write lock of the shared resource is in the idle state, determine that the client is enabled to acquire the read lock of the shared resource.

17. The distributed system according to claim 15, wherein the cache queue of the lock of the shared resource stored in the at least one memory of the serving device comprises lock state information and node state information, the node state information indicates whether an access node has acquired the lock, and the lock state information indicates whether the lock applied by the access node is in a lock released state.

18. The distributed system according to claim 15, wherein to acquire the lock acquisition request of the client, the computer program instructions, when executed by the at least one processor, cause the lock management apparatus to:

acquire the lock acquisition request of the client from the cache queue.

19. The distributed system according to claim 15, wherein the at least one pointer that points to the cache queue of the lock of the shared resource stored in the at least one memory of the serving device comprises a head pointer and a tail pointer of the cache queue.

* * * * *